United States Patent [19]

Imaizumi

[11] Patent Number: 5,072,812

[45] Date of Patent: Dec. 17, 1991

[54] HYDRAULIC SHOCK ABSORBER

[75] Inventor: Tomio Imaizumi, Kanagawa, Japan

[73] Assignee: Tokico Ltd., Kawasaki, Japan

[21] Appl. No.: 458,541

[22] Filed: Dec. 29, 1989

[30] Foreign Application Priority Data

Jan. 10, 1989 [JP] Japan ................................ 1-1351[U]

[51] Int. Cl.$^5$ ............................................ F10F 9/348
[52] U.S. Cl. ................................ 188/282; 137/493.9;
137/516.17; 188/317; 188/322.15
[58] Field of Search .................... 188/282, 317, 322.15;
137/516.13, 516.17, 516.19, 516.21, 493.9

[56] References Cited

U.S. PATENT DOCUMENTS

| | | | |
|---|---|---|---|
| 2,717,058 | 9/1955 | Brundrett | 188/322.15 X |
| 4,203,507 | 5/1980 | Tomita et al. | 188/282 X |
| 4,484,669 | 11/1984 | Kato | 188/317 X |
| 4,615,420 | 10/1986 | Mourray | 188/282 X |
| 4,724,937 | 2/1988 | Fannin et al. | 188/322.15 X |
| 4,905,799 | 3/1990 | Yamaoka et al. | 188/317 X |

FOREIGN PATENT DOCUMENTS

| | | | |
|---|---|---|---|
| 207409 | 1/1987 | European Pat. Off. | 188/322.15 |
| 2364833 | 7/1975 | Fed. Rep. of Germany | 188/317 |
| 1060824 | 11/1953 | France | 188/317 |
| 61-40533 | 3/1986 | Japan . | |
| 987111 | 3/1965 | United Kingdom | 188/317 |

Primary Examiner—George E. A. Halvosa
Attorney, Agent, or Firm—Wenderoth, Lind & Ponack

[57] ABSTRACT

A hydraulic shock absorber includes a cylinder, a piston axially slidably fitted in the cylinder so as to divide the interior of the cylinder into a first cylinder chamber and a second cylinder chamber, and a damping force generating mechanism mounted on the piston for generating damping force by controlling the flow of the working fluid between the two chambers. The damping force generating mechanism comprises first and second passages and first and second recesses. The first passage is formed through the piston oblique to the axis of the piston and connects the first and second cylinder chambers. The first recess is formed in one end of the piston on the side of the outlet end of the first passage so as to include the outlet end of the first passage. The second passage is formed through the piston parallel to the axis of the piston, at a circumferential position differing from that of the first passage, and connects the first and second cylinder chambers. The second recess is formed radially outside the first recess in the end of the piston on the side of the outlet end of the second passage. A disk valve assembly is disposed on one end of the piston on the side of the outlet end of the first passage, and includes a plurality of disk valve elements having different diameters and superposed in decreasing order of diameter on the piston so as to define a first chamber together with the first recess and to define a second chamber together with the second recess.

5 Claims, 5 Drawing Sheets

HYDRAULIC SHOCK ABSORBER

BACKGROUND OF THE INVENTION:

1. Field of the Invention

The present invention relates to a hydraulic shock absorber for vehicles and the like.

2. Description of the Prior Art

A conventional hydraulic shock absorber comprises a cylinder, a piston slidably fitted in the cylinder, dividing the interior of the cylinder into two cylinder chambers and provided with a plurality of through holes to allow the two cylinder chambers to communicate with each other, and a disk valve assembly having a plurality of superposed disk valve elements and provided at the outlet end of the corresponding through hole of the piston. The disk valve assembly controls the flow of the working fluid from the cylinder chamber on the inlet side of the through hole into the cylinder chamber on the outlet side of the through hole to generate a damping force when the piston is moved axially within the cylinder.

Japanese Utility Model Public Disclosure (Kokai) No. 61-40533 discloses such a hydraulic shock absorber as shown in FIGS. 7 to 10. This known hydraulic shock absorber has a cylinder 2, a piston 1 axially slidably fitted in the cylinder 2, dividing the interior of the cylinder 2 into an upper cylinder chamber 3 and a lower cylinder chamber 4 and provided with extension side passages 5 and contraction side passages 6, and a first valve assembly 7 and a second valve assembly 8 provided, respectively, at the outlet ends of the extension side passages 5 and the contraction side passages 6. The first valve assembly 7 is constructed by contiguously superposing a large disk valve element 7A, rings 7B, and smaller disk valve elements 7C. The second valve assembly 8 is constructed by contiguously superposing a larger disk valve element 8A, a ring 8B and smaller disk valve elements 8C. The rings 7B and 8B are disposed around the smaller disc valve elements 7C and 8C, respectively, and are biased toward the piston 1 by the larger disc valve elements 7A and 8A, respectively.

Chambers 9 and 10 are formed, respectively, in the opposite ends of the piston 1 so as to be connected, respectively, to the extension side passages 5 and the contraction side passages 6. The piston 1 is provided also with outer chambers 13 and 14 in its opposite ends, respectively, radially outside the chambers 9 and 10, and restricting passages 11 and 12 interconnecting the chambers 9 and 10, and the outer chambers 13 and 14, respectively.

When the piston 1 moves axially to the left (the right) as viewed in FIG. 7, within the cylinder 2 for the extension (contraction) stroke of the hydraulic shock absorber, the larger disk valve element 7A (larger disk valve element 8A) and the rings 7B (the ring 8B) of the first valve assembly 7 (the second valve assembly 8) are deflected to open by the pressure difference between the upper cylinder chamber 3 and the lower cylinder chamber 4 to allow the working fluid to flow through the extension side passages 5 (the contraction side passages 6), the chamber 9 (the chamber 10), the restricting passage 11 (the restricting passage 12) and the outer chamber 13 (the outer chamber 14) from the upper cylinder chamber 3 (the lower cylinder chamber 4) into the lower cylinder chamber 4 (the upper cylinder chamber 3). As the pressure difference increases, namely, as the moving speed of the piston 1 increases, the smaller disk valve elements 7C (the smaller disk valve elements 8C) are separated from the corresponding end surface of the piston 1 to allow the working fluid to flow through the extension side passages 5 (the contraction passages 6) and directly through the chamber 9 (the chamber 10) from the upper cylinder chamber 3 (the lower cylinder chamber 4) into the lower cylinder chamber 4 (the upper cylinder chamber 3). The hydraulic shock absorber thus exerts its damping force characteristics according to the pressure difference between the upper cylinder chamber 3 and the lower cylinder chamber 4.

However, a conventional shock absorber of such a type having a comparatively small effective diameter is provided with a piston having a comparatively small diameter and hence has difficulty in forming an extension side passage and a contraction side passage each having a sufficiently large sectional area through the piston. The respective diameters of the passages 5 and 6, hence the respective sectional areas of the passages 5 and 6, of the conventional hydraulic shock absorber having the foregoing construction, in particular, are limited, respectively, by the widths of the chambers 9 and 10, because the outer chambers 13 and 14 are disposed, respectively, radially outside the chambers 9 and 10. When the sectional areas of the passages 5 and 6 are not sufficiently large, the working fluid is unable to flow from the upper cylinder chamber 3 into the lower cylinder chamber 4 and vice versa, particularly, from the lower cylinder chamber 4 into the upper cylinder chamber 3 for the contraction stroke in which a comparatively small damping force is desirable, because the contraction side passages 6 having a comparatively small diameter act as orifices and restrict the flow of the working fluid during the opening action of the smaller disk valve elements 8C, so that the hydraulic shock absorber is unable to exert its desirable damping force characteristics for the contraction stroke. An increase in the number of passages to increase the total sectional area of the passages entails increase in time required for boring the passages because the passages must be formed obliquely with respect to the axis of the piston, and increase in the number of passages on a circle reduces the strength of the piston. Accordingly, it has been desired to increase the total sectional area of the passages and to form the passages in an optimum arrangement without reducing the strength of the piston and without requiring difficult machining operations.

SUMMARY OF THE INVENTION:

Accordingly, it is an object of the present invention to provide a hydraulic shock absorber provided with a piston provided with through holes formed in an appropriate arrangement and having sufficiently large sectional area.

To achieve the object, the present invention provides a hydraulic shock absorber comprising: a cylinder; and a damping force generating mechanism for generating damping force by controlling the flow of the working fluid. The hydraulic shock absorber is characterized in that the damping force generating mechanism comprises: a piston axially slidably fitted in the cylinder so as to divide the interior of the cylinder into two cylinder chambers, and provided with first passages oblique to the axis of the piston and connecting the two cylinder chambers, first recess formed in one end of the piston on the side of the outlet ends of the first passages so as to include the outlet ends of the first passages, second passages parallel to the axis of the piston, formed, respectively, at circumferential positions differing from those of the first passages, and connecting the two cylinder chambers, second recesses formed radially outside the first recess in the end of the piston on the side of the outlet ends of the second passages; and a disk valve assembly disposed on one end of the piston on the side of the outlet ends of the first passages, and comprising a plurality of disk valve elements having different diameters and superposed in decreasing order of diameter on the piston so as to define a first chamber together with the first recess and to define second chambers together with the second recesses.

Thus, the first passages are oblique to the axis of the piston, the second passages are parallel to the axis of the piston, the first passages open into the first chamber, and the second passages open into the second chambers formed radially outside the first chamber. Since the second passages are formed additionally so that the second passages may not interfere with the first passages, the total sectional area of the passages is greater than that of the passages of the conventional hydraulic shock absorber. Consequently, the restrictive effect of the second passages can effectively be reduced to provide the hydraulic shock absorber with desired linear damping characteristics.

Furthermore, the strength of the piston is not reduced significantly because the first passages and the second passages are formed, respectively, on different circles so that the first and second passages may not interfere with each other. Still further, the straight second passages parallel to the axis of the piston can easily be formed, and the machining of the second passages, as compared with that of the second passages of the conventional hydraulic shock absorber, is not difficult.

BRIEF DESCRIPTION OF THE DRAWINGS:

The above and other objects, features and advantages of the present invention will become apparent from the following description taken in conjunction with the accompanying drawings, in which.

Figure 1:
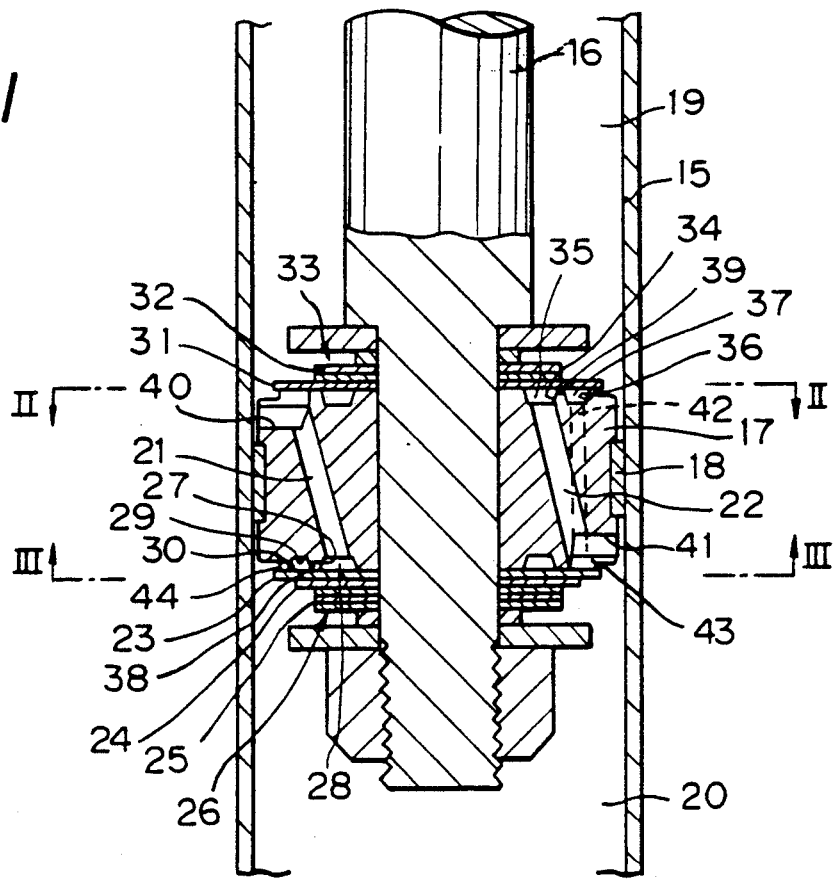
FIG. 1 is a longitudinal sectional view of an essential portion of a hydraulic shock absorber in a first embodiment according to the present invention taken on line I—I of FIG. 2.
Figure 2:
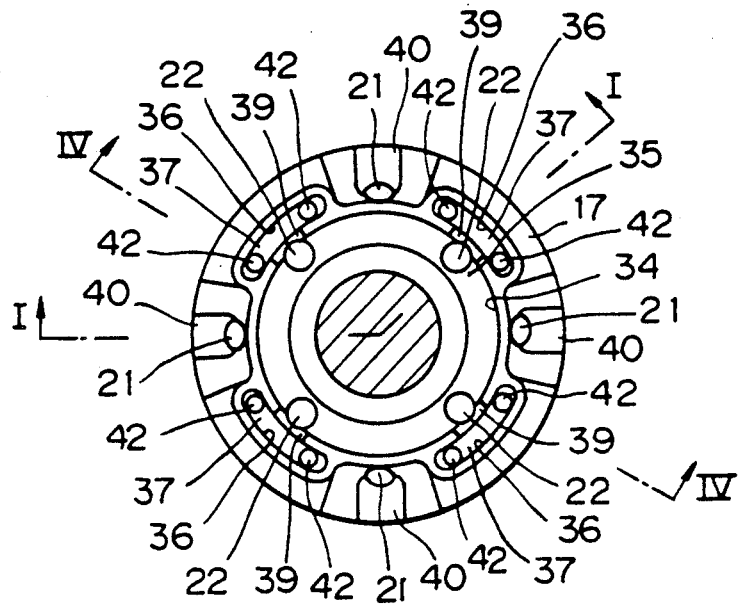
FIG. 2 is a sectional view taken on line II—II in FIG. 1.
Figure 3:
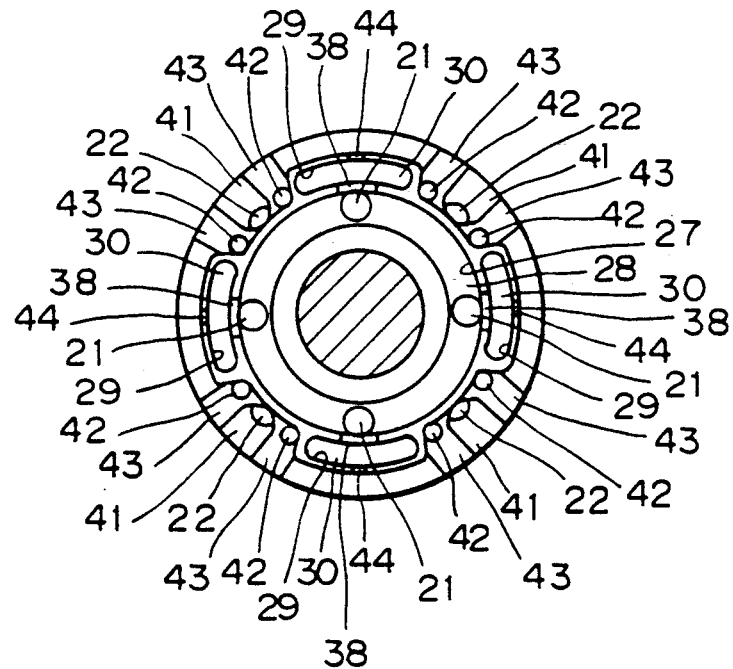
FIG. 3 is a sectional view taken on line III—III in FIG. 1.
Figure 4:
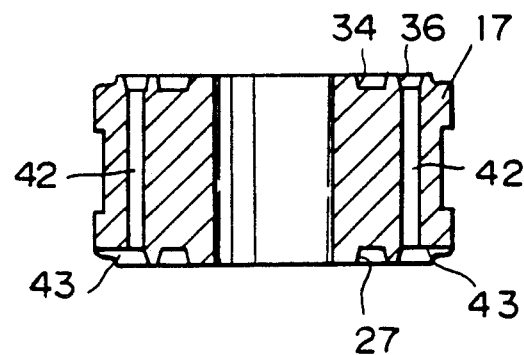
FIG. 4 is a sectional view taken on line IV—IV in FIG. 2.

DETAILED DESCRIPTION OF THE PREFERRED EMBODIMENTS:

Referring to FIGS. 1 to 4, a hydraulic shock absorber in a first embodiment according to the present invention comprises a cylinder 15, a piston 17 axially slidably fitted in the cylinder 15, dividing the interior of the cylinder 15 into an upper cylinder chamber 19 and a lower cylinder chamber 20 and provided with a piston ring 18 fitted in an annular groove formed in its circumference, and a piston rod 16 having one end fixedly mounted with the piston 17.

A damping force generating mechanism mounted on the piston 17 will be explained hereinafter.

The piston 17 is provided with four extension side passages 21 oblique to the axis of the piston 17, formed at equal angular intervals of 90°, and four first contraction side passages 22 oblique to the axis of the piston 17, formed at equal angular intervals of 90°, the extension and contraction side passages interconnecting the upper and lower cylinder chambers 19 and 20. The first contraction side passages 22 are shifted through an angle of 45° relative to the adjacent extension side passages 21.

A first disk valve assembly 26 has a larger disk valve element 23, a middle disk valve element 24 and smaller disk valve elements 25 superposed in that order. The disk valve assembly 26 is placed on the lower end, namely, the end facing the lower cylinder chamber 20 into which the outlet ends of the extension side passages 21 open, of the piston 17 with the larger disk valve element 23 in contact with the lower end of the piston 17. The outlet ends of the extension side passages 21 open into an annular recess 27 formed in the lower end of the piston 17. A first extension side oil chamber 28 is defined by the disk valve assembly 26 and the recess 27.

Four recesses 29 are formed radially outside the annular recess 27 at equal angular intervals of 90° at positions corresponding, respectively, to the outlet ends of the extension side passages 21 in the lower end of the piston 17. The disk valve assembly 26 and the recesses 29 define second extension side oil chambers 30. The surface of the lower end of the piston 17 on which the larger disk valve element 23 is seated is designated a seating surface.

A second disk valve assembly 33 has a larger disk valve element 31 and smaller disk valve elements 32 superposed in that order. The second disk valve assembly 33 is placed on the upper end, namely, the end facing the upper cylinder chamber 19 into which the outlet ends of the first contraction side passages 22 open, with the larger disk valve element 31 in contact with the upper end of the piston 17. An annular recess 34 is formed in the upper end of the piston 17. The outlet ends of the first contraction side passages 22 open into the annular recess 34. The second disk valve assembly 33 and the annular recess 34 define a first contraction side oil chamber 35.

Four recesses 36 are formed radially outside the annular recess 34 at equal angular intervals of 90° at positions corresponding, respectively, to the outlet ends of the first contraction side passages 22. The recesses 36 and the second disk valve assembly 33 define second contraction side oil chambers 37. The recesses 36 are shifted through an angle of 45° relative to the recesses 29 formed in the lower end of the piston 17. The surface of the upper end of the piston on which the larger disk valve element 31 of the second disk valve assembly 33 is seated is designated a seating surface.

The first extension side oil chamber 28 is connected to the second extension side oil chambers 30 by cutouts or restriction passages 38 formed in the seating surface at positions corresponding, respectively, to the outlet ends of the extension side passages 21. Similarly, the first contraction side oil chamber 35 is connected to the second contraction side oil chambers 37 by cutouts or connecting passages 39 formed in the seating surface at positions corresponding, respectively, to the outlet ends of the first contraction side passages 22. The restriction passages 38 restrict the flow of the working fluid from the first extension side oil chamber 28 into the second extension side oil chambers 30 to generate a high damping force in the extension stroke. If the flow of the working fluid is not restricted in the extension stroke, the working fluid is allowed to flow at a high flow rate from the first extension side oil chamber 28 into the second extension side oil chamber 30, and the same pressures prevail always in the first and second extension side oil chambers 28 and 30 to lift the larger disk valve element 23 by a substantial amount and, consequently, the smaller disk valve elements 25 are unable to function to generate a high damping force.

The inlet ends of the extension side passages 21 communicate with the upper cylinder chamber 19 by means of radial grooves 40 formed in the periphery of the upper end of the piston 17. Similarly, the inlet ends of the first contraction side passages 22 communicates with the lower cylinder chamber 20 by means of radial grooves 41 formed in the periphery of the lower end of the piston 17.

The second extension side oil chambers 30 formed in the lower end of the piston 17 communicate with the lower cylinder chamber 20 by means of restriction passages 44 formed in the seating surface.

The piston 17 is further provided with pairs of straight second contraction side passages 42 parallel to the axis of the piston 17. Each pair of the second contraction side passages 42 is formed between two adjacent of the first contraction side passages 22. The outlet ends of the pairs of straight second contraction side passages 42 parallel to the axis of the piston 17 open into the second contraction side oil chambers 37. The second contraction side oil chambers 37 communicate with the lower cylinder chamber 20 by means of the second contraction side passages 42 and radial grooves 43 formed in the periphery of the lower end of the piston 17.

The depth of the radial grooves 41 connecting the first contraction side passages 22 to the lower cylinder chamber 20 is greater than that of the radial grooves 43 connecting the second contraction side passages 42 to the lower cylinder chamber 20.

Thus, the first contraction side passages 22 are oblique to the axis of the piston 17, the second contraction side passages 42 are parallel to the axis of the piston 17, the first contraction side passages 22 communicate with the first contraction side oil chamber 35, and the second contraction side passages 42 communicate with the second contraction side oil chambers 37. Therefore, the passages 22 and 42 can be formed in a circular arrangement in the piston 17 without entailing significant reduction in the strength of the piston 17, so that a sufficiently large flow passage area is secured and a restrictive effect of the first contraction side passages 22 on the flow of the working fluid is prevented.

The operation of the hydraulic shock absorber will be explained hereinafter.

Figure 5:
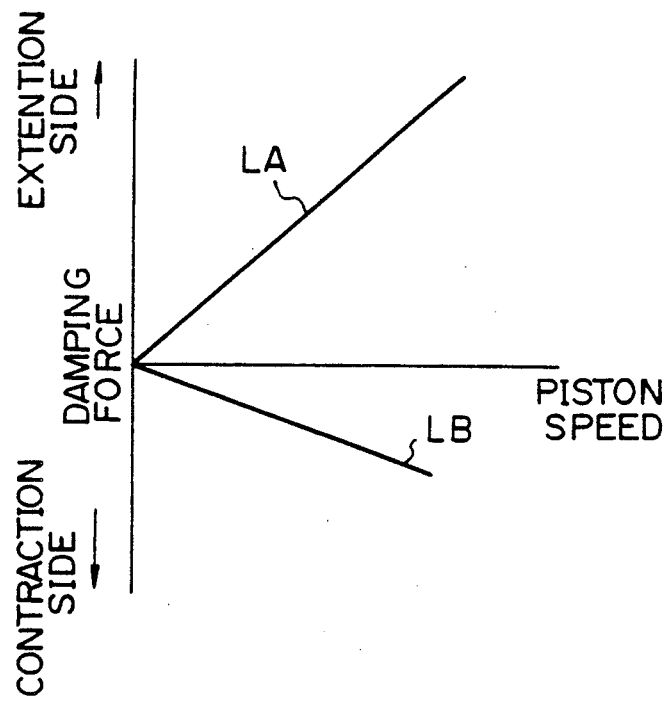
FIG. 5 is a graph showing the damping characteristics of the hydraulic shock absorber of FIG. 1.

In the extension stroke, in which the piston 17 moves upward as viewed in FIG. 1, the pressure of the working fluid in the upper cylinder chamber 19 increases over that in the lower cylinder chamber 20. Then, the working fluid flows from the upper cylinder chamber 19 into the lower cylinder chamber 20 through the grooves 40, passages 21, first extension side oil chamber 28, the restriction passages 38, the second extension side oil chambers 30 and the restriction passages 44. The restriction passages 44 restrict the flow of the working fluid to generate a damping force. The pressure in the first extension side oil chamber 28 and the second extension side oil chambers 30 increases as the pressure in the upper cylinder chamber 19 increases; consequently, the larger disk valve element 23, the middle disk valve element 24 and the smaller disk valve elements 25 are deflected gradually in that order to generate damping force varying linearly with the moving speed of the piston 17 as indicated by a straight line LA in FIG. 5.

The disk valve elements 23, 24 and 25 suppress the flow of the working fluid through the extension passages 21 to generate a comparatively large damping force during the extension stroke, and hence the restrictive action of the extension passages 21 is insignificant.

In the contraction stroke, the piston 17 moves downward, as viewed in FIG. 1, so that the pressure of the working fluid in the lower cylinder chamber 20 increases over that of the working fluid in the upper cylinder chamber 19. In the initial stage of the contraction stroke, similarly to the action in the extension stroke, a damping force is generated. Subsequently, the larger disk valve element 31 and the smaller disk valve elements 32 are deflected sequentially in that order as the pressure of the working fluid in the first contraction side passages 22 and the second contraction side passages 42 increases to generate damping force varying linearly with the moving speed of the piston 17 as indicated by a straight line LB in FIG. 5.

Since the first contraction side passages 22 and the second contraction side passages 42 provide a large flow passage area for the contraction stroke, the flow of the working fluid is not restricted excessively by the orifice effect of the first contration side passages 22 and the second contraction side passages 42, so that the hydraulic shock absorber exerts desirable linear damping characteristics. If the restrictive effect of the extension passages 21 is excessively large, straight second extension side passages, not shown, connecting the second extension side oil chambers 30 and the upper cylinder chamber 19 may be formed additionally in the piston 17.

Figure 6:
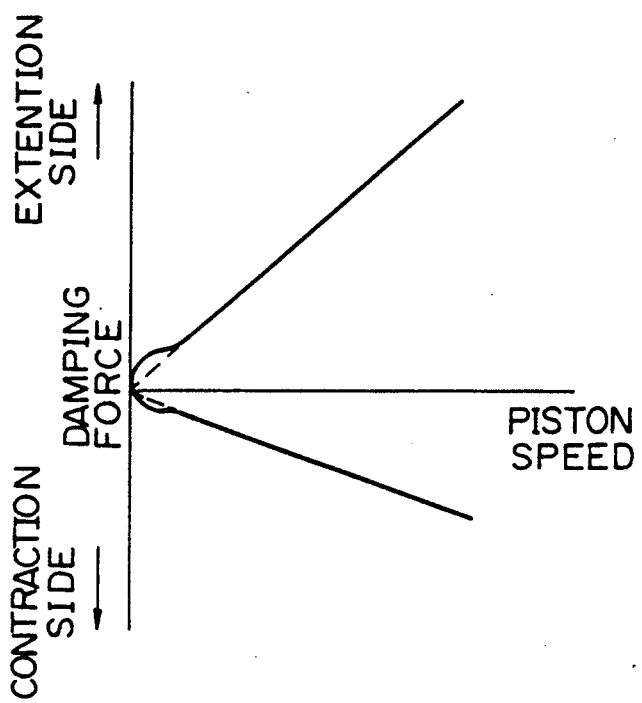
FIG. 6 is a graph showing the damping characteristics of a hydraulic shock absorber in a second embodiment according to the present invention.
Figure 7:
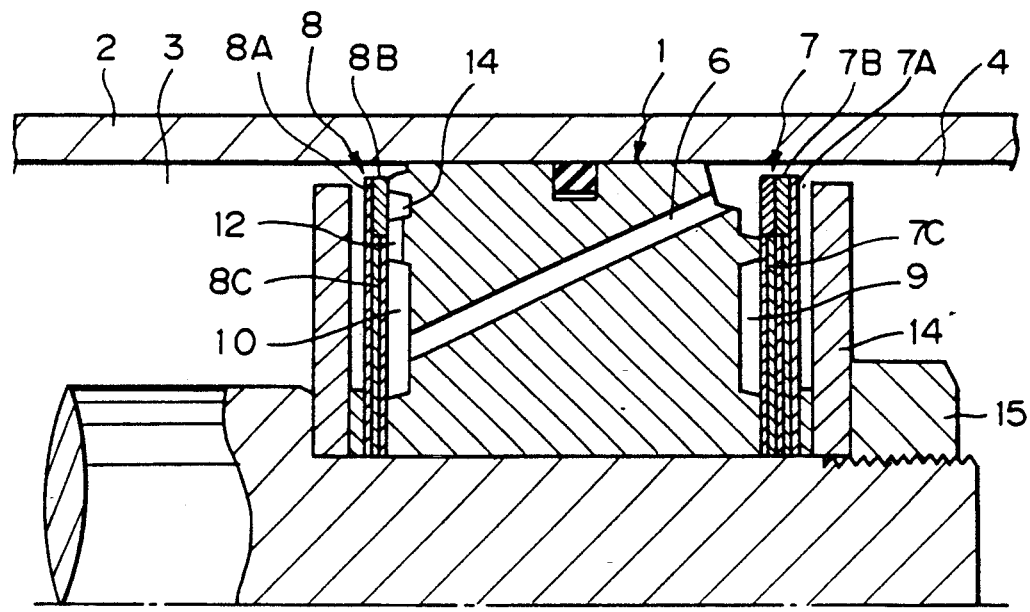
FIG. 7 is a half-sectional view of an essential portion of a conventional hydraulic shock absorber.
Figure 8:
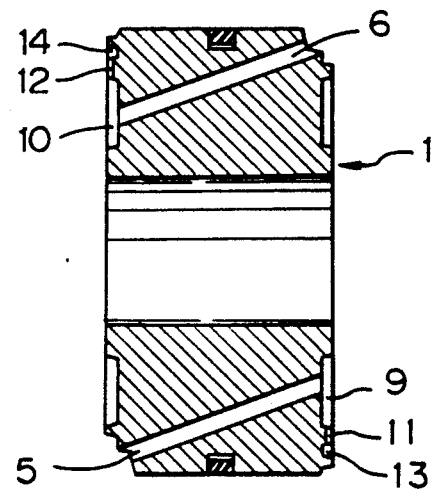
FIG. 8 is a sectional view of a piston employed in the hydraulic shock absorber of FIG. 7.
Figure 9:
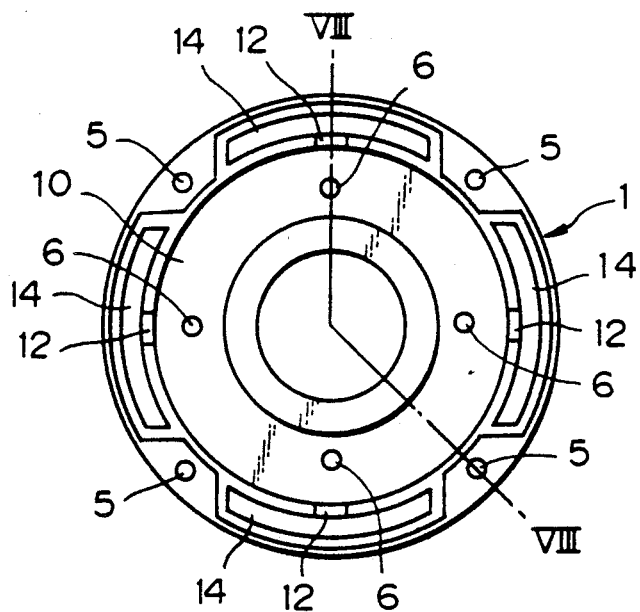
FIG. 9 is a left end view of the piston of FIG. 8.
Figure 10:
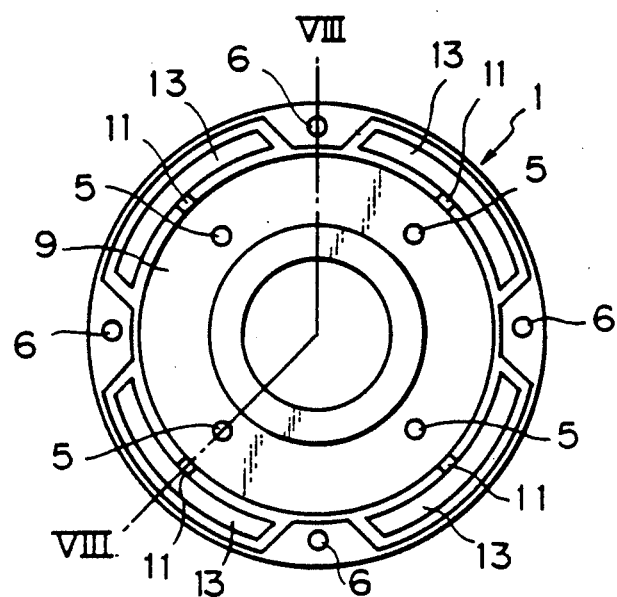
FIG. 10 is a right end view of the piston of FIG. 8.

The damping force characteristics of the hydraulic shock absorber are dependent on the combined effects of the flow passage area of the restriction passages 44, the number and dimensions of the disk valve elements 23, 24, 25, 31 and 32, and the like. When a comparatively high damping force is required for the initial stage of damping operation of the hydraulic shock absorber, in which the moving speed of the piston 17 is low, the hydraulic shock absorber may be provided with damping force characteristics as shown in FIG. 6 by omitting the restriction passages 44, and forming the seating surfaces of the piston 17 on which the disk valve assemblies 26 and 33 are seated respectively in concave surfaces to enable the disk valve assemblies 26 and 33 to flex in the initial stage of damping operation.

The following features of the hydraulic shock absorber in the first embodiment facilitate the machining of the components of the hydraulic shock absorber.

The second contraction side passages 42 parallel to the axis of the piston 17 can be formed in the piston 17 without requiring additional machining in forming the piston 17 by molding and sintering.

Since the restriction passages 38 and the connecting passages 39 are formed, respectively, opposite to and contiguously with the respective outlet ends of the extension side passages 21 and the first contraction side passages 22, the respective outlet ends of the extension side passages 21 and the first contraction side passages 22 do not open on the seating surfaces, and burrs are not formed in the seating surfaces. This is true even when the respective outlet ends of the extension side passages 21 and the first contraction side passages 22 deviate from the correct positions, respectively, toward the second extension side oil chambers 30 and the second contraction side oil chambers 37 when boring the extension side passages 21 and the first contraction side passages 22 obliquely to the axis of the piston 17 with a drill. Hence, a finishing operation for removing burrs is not necessary.

Since the depth of the radial grooves 41 connecting the inlet ends of the first contraction side passages 22 to the lower cylinder chamber 20 is greater than that of the radial grooves 43 connecting the inlet ends of the second contraction side passages 42 to the lower cylinder chamber 20, the radial grooves 41 are available as guides for a tool in boring the first contraction passages 22 obliquely to the axis of the piston 17, thus to prevent deviation of the first contraction side passages 22 from the correct positions. As is obvious from FIG. 2, the radial grooves 40 also are able to serve as guides for a tool in boring the extension passages 21.

As is apparent from the foregoing description, a hydraulic shock absorber according to the present invention employs a piston provided with both first contraction side passages oblique to the axis of the piston and second contraction side passages parallel to the axis of the piston, such passages having outlet ends opening, respectively, into the first contraction side oil chamber and the second contraction side oil chambers, thus securing a sufficiently large flow passage area for the contraction stroke and reducing the restrictive effect of the contraction side passages to an insignificant extent, so that the hydraulic shock absorber exerts a damping action of linear damping characteristics, even if the effective diameter of the hydraulic shock absorber is comparatively small.

Furthermore, since the piston is provided with passages of an increased flow passage area to reduce the restrictive effects of the passages, the pressures in the cylinder chambers never increase excessively, and hence the cylinder can surely be sealed pressure-tight and the rated pressures of the components subject to the pressures in the cylinder chamber, such as shaft seals for making pressure-tight joints between the cylinder and the piston rod, need not be very high.

I claim:

1. A hydraulic shock absorber comprising:
   a cylinder;
   a piston axially slidably fitted in the cylinder so as to divide the interior of the cylinder into a first cylinder chamber and a second cylinder chamber; and
   a damping force generating mechanism mounted on said piston for generating damping force by controlling the flow of the working fluid between said two cylinder chambers, said damping force generating mechanism comprising:
   at least one first passage formed through said piston oblique to the axis of said piston and connecting said first and second cylinder chambers,
   a first recess formed in one end of said piston on the side of an outlet end of said first passage so as to include said outlet end of said first passage,
   at least one second passage formed through said piston parallel to said axis of said piston, at a circumferential position differing from that of said first passage, and connecting said first and second cylinder chambers,
   a second recess formed radially outside said first recess in said one end of said piston on the side of an outlet end of said second passage so as to include said outlet end of said second passage;
   a partition wall separating said first recess and said second recess from each other, and a cutout formed in a top surface of said partition wall and connecting said first and second recesses with each other, said outlet end of said first passage opening into said first recess at a position circumferentially corresponding to said connecting cutout; and
   a disk valve assembly disposed on said one end of said piston on said side of said outlet end of said first passage, said assembly comprising a plurality of disk valve elements having different diameters and superposed in decreasing order of diameter on said piston so as to define a first chamber together with said first recess and to define a second chamber together with said second recess, and means for fixing inner peripheries of said disk valve elements to said one end of said piston so that said inner peripheries are incapable of flexing and such that, when pressure is received through said first and second passages through inlet ends thereof to said outlet ends thereof, outer peripheries of said disk valve elements sequentially flex away from said one end of said piston in said decreasing order of diameter as said pressure increases, thereby providing a sequentially increasing damping force.

2. A hydraulic shock absorber according to claim 1, wherein said piston is formed by molding, and said second passage is formed in said piston during molding of said piston.

3. A hydraulic shock absorber according to claim 1, wherein said inlet end of said first passage opens into a recess formed in an end of said piston opposite said one end thereof on which said disk valve assembly is disposed.

4. A hydraulic shock absorber according to claim 1, wherein said disk valve assembly has damping characteristics which increase damping force linearly with the moving speed of said piston.

5. A hydraulic shock absorber according to claim 1, wherein said damping force generating mechanism generates damping force during a contraction stroke of said piston.

* * * * *